United States Patent [19]
Nürnberger

[11] Patent Number: 5,392,668
[45] Date of Patent: Feb. 28, 1995

[54] ACTUATING MEANS FOR A MULTISPEED CYCLE HUB

[75] Inventor: Günter Nürnberger, Schweinfurt, Germany

[73] Assignee: Fichtel & Sachs AG, Schweinfurt, Germany

[21] Appl. No.: 302,460

[22] Filed: Jun. 25, 1993

[30] Foreign Application Priority Data

Jul. 2, 1992 [DE] Germany .................. 4221728

[51] Int. Cl.[6] .................................................. F16C 1/10
[52] U.S. Cl. .................................... 74/502.2; 74/489;
74/488; 74/501.5 R; 74/500.5; 474/82
[58] Field of Search ............ 74/500.5, 501.5 R, 502.2,
74/501.6, 502.4, 502.6, 488, 489; 474/82, 83, 80

[56] References Cited

U.S. PATENT DOCUMENTS

| 4,731,045 | 3/1988 | Nagano | 474/80 X |
| 4,801,287 | 1/1989 | Romano | 474/82 |
| 4,833,937 | 5/1989 | Nagano | 474/82 X |
| 4,947,703 | 8/1990 | Bergles | 74/501.5 R |
| 5,201,236 | 4/1993 | Nagano | 74/500.5 X |

FOREIGN PATENT DOCUMENTS

| 0091324 | 10/1983 | European Pat. Off. | 474/82 |
| 0350791 | 1/1990 | European Pat. Off. | 74/501.5 R |
| 2506251 | 11/1982 | France | 474/82 |
| 2127880 | 12/1971 | Germany | 474/82 |
| 2654426 | 6/1977 | Germany | 474/82 |
| 3314229 | 10/1984 | Germany | 74/500.5 |
| 3440066 | 5/1986 | Germany | 474/82 |
| 424814 | 2/1935 | United Kingdom | 74/500.5 |
| 732035 | 6/1955 | United Kingdom | 474/82 |

*Primary Examiner*—Vinh T. Luong
*Attorney, Agent, or Firm*—Brumbaugh, Graves, Donohue & Raymond

[57] ABSTRACT

An actuating mechanism for a multispeed cycle hub comprises a housing adapted to be attached to an end of a hub shaft. A first cam, a second cam, and a pinion having engaging teeth are received in the housing for conjoint rotation. An elongated rack element is mounted for movement along an axis in the housing and is adapted to be coupled to a speed-selection device by a force-transmission member and includes a row of teeth in driving engagement with the engaging teeth of the pinion. A first pivot lever is pivotally mounted in the housing in constant contact with the first cam so as to follow a pivoting motion defined by the shape of the first cam and engages one of two speedchange elements, which are coupled to the transmission in the hub, so as to move the first speed change element upon pivotal movement in response to rotation of the first cam. A second pivot lever is pivotally mounted in the housing in constant contact with the second cam so as to follow a pivoting motion defined by the shape of the second cam and engages the other of the two speed change elements so as to move the second speed change element upon pivotal movement in response to rotational movement of the second cam.

23 Claims, 4 Drawing Sheets

ACTUATING MEANS FOR A MULTISPEED CYCLE HUB

BACKGROUND OF THE INVENTION

The invention relates to an actuating means for a multispeed cycle hub having an axle defining an axis of rotation with two hub ends, a hub shell rotatably mounted on the axle, a transmission changeable among several speeds inside the shell, at least one drive gear in drive connection with an input element of the transmission, at least one output element of the transmission in drive connection with the shell, a bore extending along the axis of rotation in the axle and accommodating two elongated, compressionally rigid speed change elements extending parallel to the axis of rotation, the inner ends of the speed change element being coupled to the transmission for changing between speeds and outer end(s) of the speed change elements extending into the region of either of the two hub ends.

The actuating means is attached to one hub end. It is connected by way of a force-transmitting member to a speed selection means, which may be manually actuable, and which for this purpose is often arranged within reach of the cyclist. The force transmission member comprises for example a tensionally and compressionally rigid cable guided in a flexible sleeve extending between the actuating means and the speed selection means. To diminish the projection of the actuating means attached laterally to the cycle, i.e. the length of the actuating means parallel to the axis of rotation, the force-transmitting member is as a rule disposed in transverse direction to the axis away from the actuating means. By reason of the resulting deflection of force, the actuating means may be alternatively referred to as a deflecting means.

In the multispeed hubs here concerned (as a rule, more than three speeds, for example 5 or 7 speeds), however, the actuating means has still another function. For, in order to shift among the several speeds, in particular when a planetary gear is employed, the two speed-change elements initially referred to are required. One of the two speed-change elements serves for example to shift Between the steps of a multistep planetary gear. The other speed-change element, by contrast, permits shifting for example between a direct speed bypassing the planetary gear and grade speeds with power feed-in from the drive gear into the hollow gear of the planetary gearing, as well as high speeds with power feed-in from the drive gear to the planetary gear carrier of the planetary gearing. For actuation of these two speed-change elements independently of each other, two force-transmission members are required, which accordingly lead to two speed selection means or to a single combination speed selection means. These two force-transmitting elements, in conventional systems, are each passed out of one of the two hub ends. But this results in great structural as well as assembly and/or disassembly outlay.

The invention deals with an actuating means attached to one of the two hub ends, such that a single force-transmitting element will suffice. For this purpose, in the actuating means, both a shift motion for the one speed-change element and for the other speed-change element is derived from the linear motion of the one force-transmitting element between the various shift steps corresponding to the several speeds.

U.S. Pat. No. 4,947,703 (corresponding to European Patent 0,350,791 A2) discloses an actuating means of the kind initially mentioned in which an essentially U-shaped housing attached to one hub end accommodates two pivotably mounted sector shaped cams engaged directly by the force-transmitting member by way of a rigid U-shaped connecting part for actuation correspondingly. The two pivot levers are mounted by one of their two ends to a common hearing on the housing, while their other two ends each engage one of the two speed-change elements. Of the two speed-change elements, one is sleeve-shaped, while the other takes the form of a rod guided inside of the sleeve. The end of the corresponding pivot lever that engages the sleeve is therefore correspondingly fork shaped. Between their two ends, each of the two pivot levers is in contact with the corresponding cam, so that when the cams pivot because of a corresponding actuation of the speed selection means., they will push the speed-change element in question more or less far into the huh axle. The two cams together with their common pivot lie on the side of the pivot lever away from the cycle hub. The mechanics are not very robust, in particular owing to the use of small tubes and rods for the speed-change elements, with correspondingly complicated conformation of the ends of the two pivot levers, so that trouble is possible in rough everyday service.

U.S. patent application Ser. No. 08/063,930 (corresponding to European Patent Application EP 93 108 190.5) discloses a similar actuating means, in which, however, instead of the motion control of the pivot levers by way of two cams, there is a control by way of a linearly movable control part comprising two cams. Each cam is sensed by a sensor projection in the mid length region of the pivot lever in question. The control part is mounted directly on the end of the force-transmission member on the side of the pivot levers away from the cycle hub, to be thrust to and fro by the force-transmitting member to change speeds. Here also, the resulting structure is not very compact, with comparatively great axial length.

SUMMARY OF THE INVENTION

The object of the invention is to provide an actuating means for multispeed cycle hubs of the kind initially mentioned., that will function dependably with compact structure.

The foregoing and other objects are attained, in accordance with the present invention, by an actuating mechanism that comprises a housing adapted to be attached to an end of a hub shaft. A first cam, a second cam, and a pinion having engaging teeth are received in the housing for conjoint rotation. An elongated rack element is mounted for movement along an axis in the housing and is adapted to be coupled to a speed-selection device by a force-transmission member. The rack element has a row of teeth in driving engagement with the engaging teeth of the pinion. A first pivot lever is pivotally mounted in the housing in constant contact with the first cam so as to follow a pivoting motion defined by the shape of the first cam and engages one of two speed change elements, which are coupled to the transmission in the hub, so as to move the first speed change element upon pivotal movement in response to rotation of the first cam. A second pivot lever is pivotally mounted in the housing in constant contact with the second cam so as to follow a pivoting motion defined by the shape of the second cam and engages the other of the two speed change elements so as to move the second speed change element upon pivotal movement in response to rotational movement of the second cam.

In the mechanism of the present invention, the motion of the two cams is not controlled directly by the force-transmission element and is, instead, controlled by the rack and pinion drive.

The rack and pinion drive may be placed in a suitable location so that a short axial length of the actuating mechanism will result. The rack-and-pinion drive may readily be integrated in a housing closed off from the outside. The rack-and-pinion drive is dependable. Also, the transmission ratio can be adapted by suitable selection of the number of teeth on the pinion to the prevailing conditions, the torque transmitted being independent of the current lengthwise position of the force-transmission member—in contrast to the arrangement according to the U.S. Pat. No. 4,947,703 initially mentioned. According to the invention, the advantages of a rotary slide control are combined with that of a rack-and-pinion drive.

In an especially advantageous modification of the invention, an arresting means arranged in the housing and cooperating with the pivot element is provided, determining several arrest positions of the pivot element, each corresponding to a speed of the shiftable gear. This indexing provides for an exact shifting of gears, independent of play or maladjustments in the region of the speed-selection means and the force-transmission member. Yet the several speeds can be felt by the person operating the speed-change means, thus much facilitating operation.

For especially dependable arresting function in compact construction, according to a refinement of the invention, provision is made for the arresting means to comprise an arrest projection element movably mounted in the housing between an engaged position and a disengaged position and biased into the engaged position by means of a spring element, which projection element engages an undulating arrest curve provided on the rack element, said arrest curve comprising several arrest recesses arranged consecutively along the lengthwise axis, each associated with a speed. The arresting means might indeed alternatively act on a peripheral arrest curve provided on the pivoting element; in that case, however, the pivot element would require another axial segment in addition to the two cams and the pinion. This would militate against a compact structure.

In order to provide for dependable long-term function with simple assembly and disassembly, it is proposed that the housing comprise two parts, connected to each other, forming a substantially closed housing. The closed housing prevents entry of dirt, moisture or the like.

At the same time, provision may be made for at least one of the housing parts to be provided with means for suspension of at least one of the parts: pivot element, first pivot lever, second pivot lever, rack element. This measure simplifies assembly, since a preassembly is possible. For this purpose, the part in question (.pivot element, pivot lever, rack element) is placed in the intended position for that part in the particular housing part. Then the two housing parts are put together.

The housing parts may in particular be half housings.

An especially advantageous embodiment of the invention is characterized in that a return spring means cooperating with the pivot element, but operative for only some of the speeds, is provided in the housing, which for this portion of the speeds supports the change in a preassigned direction. The return spring means has the result that all shift operations for which corresponding forces must be expended into the speed-change elements from the actuating means are initiated by loading the force-transmission member in a preassigned direction, in particular in the direction of tension. In other words, all shift paths that occasion forces are relegated to the tension stage of the force-transmitting member. A force-transmitting member stressed chiefly in tension (in particular a tension cable) is substantially simpler in structure and simpler to manipulate than a force-transmission member transmitting force in two directions. In the case of a seven-speed hub with three-step planetary gear, with speeds 1 to 3 as grade speeds, speed 4 as direct speed and speeds 5 to 7 as high speeds, the pivot lever effecting the shift between the planetary gear steps in transition from 7th to 6th and from 6th to 5th must increasingly be pivoted towards the hub, axle, and this against the force of a prestress spring inside the cycle hub. If for example the 7th speed represents the position of the rack element with force-transmitting member farthest extended out of the housing, then to execute the change motion from 7th to 6th speed and from 6th to 5th speed a corresponding compression would have to be exerted on the rack element by the force-transmitting member. By virtue of the restoring spring means according to the invention, such compression is not required, since the return motion of the rack element is assisted by the restoring spring means.

Simple dependable structure of the restoring spring means is assured in that the restoring spring means comprises an elongated spring lodged in the housing, one of its two ends abutting one of the two housing parts and the other end pressing against the rack element when it is in positions corresponding each to one of the said portion of the speeds. This effect is contributed to by the fact that the other end of the spring abuts a holding element comprising a recess, and in that the rack element comprises a projection movable through the recess in order to carry along the other end of the spring.

According to an especially preferred modification of the invention, it is provided that the first and the second pivot lever be of a two-arm configuration, each with a cam-following end and an actuating end acting on the speed-change element in question. In this way, the cams may be arranged on the side of the pivot levers towards the cycle hub, thus further contributing to reduction of the structural axial length of the actuating means.

To enhance the robustness of the combination of actuating means and multispeed cycle hub, it is proposed that the two speed-change elements comprise compression rods extending parallel to the axis of rotation in the bore and located side by side transverse to the axis of rotation. So that the compression rods according to the invention will he of sufficient mechanical stability even with relatively small diameter of the hub bore, it is proposed that the compression rods he of approximately semicircular cross-section, the diameters of the semicircles facing each other. In order to minimize losses due to friction between engaging flat surface it is supposed that the two compression rods be in contact with each other by way of projections extending parallel to the axis of rotation.

In this connection, it is proposed that one of the two compression rods be configured longer than the other and extend farther into the hub, axle than the other compression rod, and that these compression rods be secured against twisting. The longer compression rod, by virtue of its contact with the shorter compression rod, ensures that the shorter compression rod also will always maintain the prescribed orientation. Hence the pivot levers need not contribute to maintaining the orientation of the compression rods, so that their ends in contact with the compression rods may he of especially simple conformation, in particular in the form of rounded fingers.

The invention relates, finally, to a multispeed cycle shift system comprising a multispeed cycle hub with an actuating means a speed selection means and a force-transmitting member connecting the actuating means to the speed-selection means.

DESCRIPTION OF THE DRAWINGS

The invention will be illustrated in the following in terms of an embodiment with reference to the drawing by way of example. In the drawing.

DESCRIPTION OF THE EMBODIMENT

Figure 9:
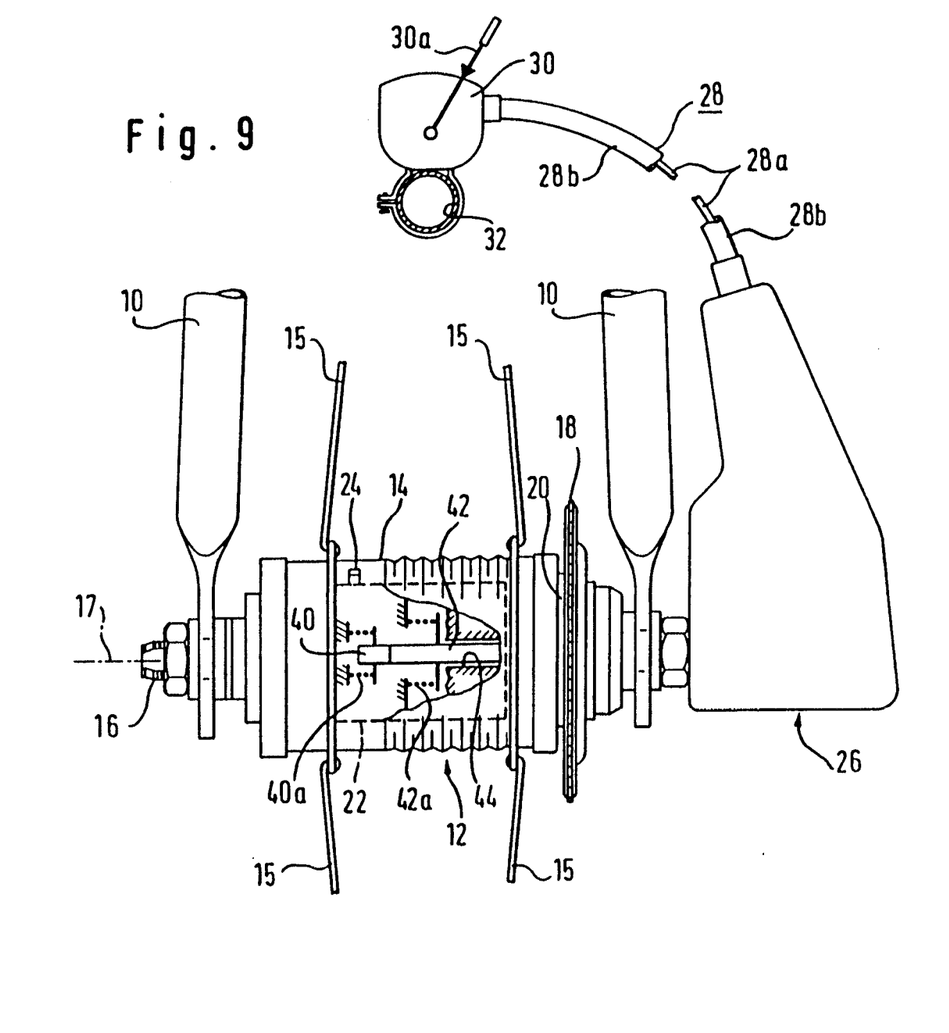
FIG. 9 shows a rough schematic general view of a multispeed cycle hub provided with the actuating means, plus force-transmitting member and speed-selection means.

FIG. 9 shows the rear portion 10 of a cycle frame to which a multispeed cycle hub 12 is attached. The latter comprises a hub sleeve 14 rotatably mounted on a hub axle 16. The hub axle 16 thus defines an axis of rotation 17, about which the hub sleeve 14 rotates, and with it a rear wheel rim (not shown), connected to the hub sleeve 14 by spokes 15. A sprocket wheel 18 is rotatably mounted on the hub axle 16 and connected to a drive element 20. The drive element 20 forms the input element of a transmission 22 arranged inside the hub sleeve 14 and shiftable among several speeds. A symbolically indicated overtaking clutch marked 24 forms the output element of the transmission 22 and drives the hub sleeve 14. An actuating unit 26 is mounted on one of the two ends of the hub axle 16 and connected by way of a force-transmitting member in the form of a Bowden cable 28 to a speed selection means 30. The means 30 is for example fastened to a tubular handle bar 32 of the cycle. The speed selection means 30 has a manually actuable shift lever 30a. This acts on a Bowden wire 28a inside a Bowden sheath 28b, the two forming the said Bowden cable 28.

The actuating means 26, which may alternatively be referred to as a deflection means, serves to convert the shifting motion of the Bowden wire 28a into shift motions of two speed-change elements inside of the cycle hub 12. These speed-change elements are formed by two compression rods 40, 42 extending parallel to the axis of rotation 17 inside of a bore 44 in the hub axle 16.

The actuating means 26 comprises (see FIGS. 1 to 3) a housing 46 consisting of two half-housings 48 and 50, sealing off the functioning parts of the actuating means from the outside. The two half-housings 48, 50 have bearing locations 52a and 52b in which stub shafts 54a, 54b of a pivot element 54 are rotatably mounted. The pivot element 54 defines a pivot axis 54c. The pivot element 54 comprises in succession, from left to right in FIG. 2, the stub shaft 54a, a pinion 54d, a first cam K1, a narrow radially projecting dividing web 54e, a second cam K2, and the stub shaft 54b.

The first cam K1 cooperates with a first pivot lever H1. The second cam K2 cooperates with a second pivot lever H2. Both pivot levers are mounted on a common pivot pin 56, defining a pivot lever axis 56a. The pivot pin 56 may, as in FIGS. 1 and 3, be inserted By its two ends in corresponding bearing recesses 56b and 56c in the half-housings 48 and 50 respectively, for a bearing at each end. If preferred, it may suffice to mount the pivot pin 56 in only one of the two half-housings 48, 50.

With the outer peripheral teeth of the pinion 54d, lengthwise teeth 58a cooperate, arranged on an elongated rack element 58 extending in the lengthwise direction 58b thereof.

Figure 1:
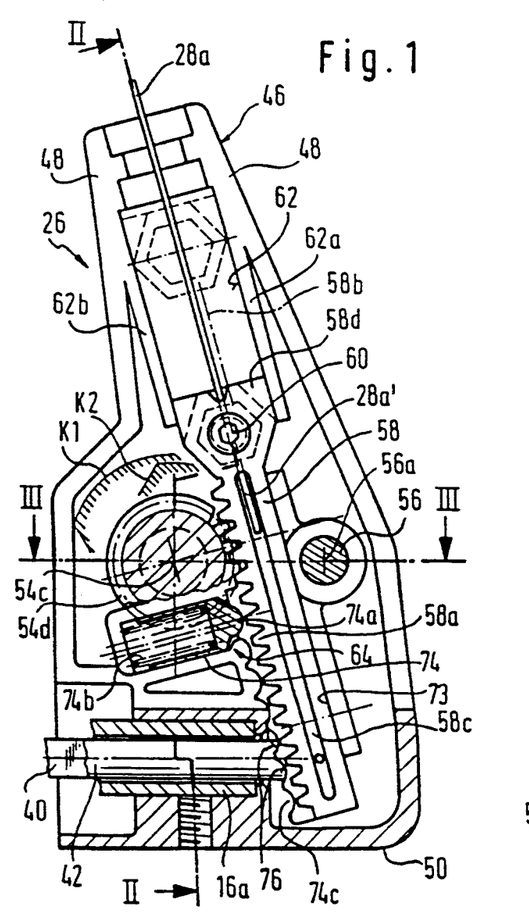
FIG. 1 shows an actuating means for a transmission unit with essential functioning parts in section at the line I—I in FIG. 2.

The rack element 58 is attached to the Bowden wire 28a by means of a fastening screw 60, to provide for ample adjustment play, the slide-like rack element 58 is provided with a receptacle 58c extending over substantially the entire length of the rack element 58 to receive the free end segment 28a' of the Bowden wire 28a following the fastening screw downward at the upper end of the rack element 58 in FIG. 1.

The upper end of the rack element 58, accommodating the fastening screw 60, forms a rack element head 58d. This is guided in the half-housing 48 in a double guide 62 comprising two guide ribs 62a and 62b located opposed to each other. Adjoining the head 58d, the rack element 58 is guided by a simple slide guide 73 formed essentially by a housing wall on the side of the rack element 58 opposed to the pinion 54d. This guide 73 carries those forces which are produced by the rack 58a and pinion 54d in mutual tooth engagement.

Further, the guide 73 carries forces produced by an arrest means generally marked 64. This arrest means is formed by an arrest projection element in the form of an arrest pin 74 whose head 74a is pressed into engagement with an arrest cam 74c by a helical compression spring 74b. The arrest cam 74c consists of a plurality of arrest apertures 76, each associated with a speed of the transmission of the cycle hub 12, which apertures are arranged in succession on the rack element 58 paralleling the longitudinal axis 58b. The arrest pin 74 is on the same side of the rack element 58 as the pinion 54d.

Figure 4:
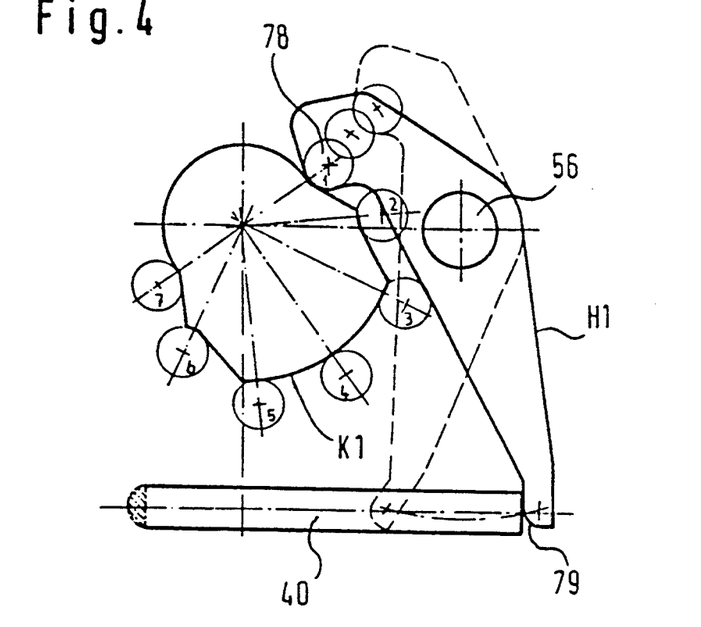
FIG. 4 shows a first cam with first pivot lever with the associated possible shift steps.
Figure 5:
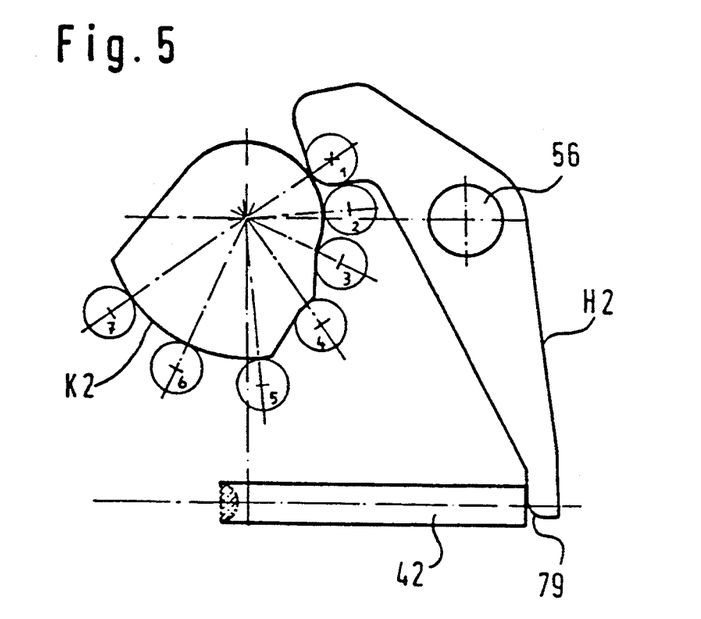
FIG. 5 shows a second cam with a second pivot lever with the associated possible shift steps.
Figure 6:
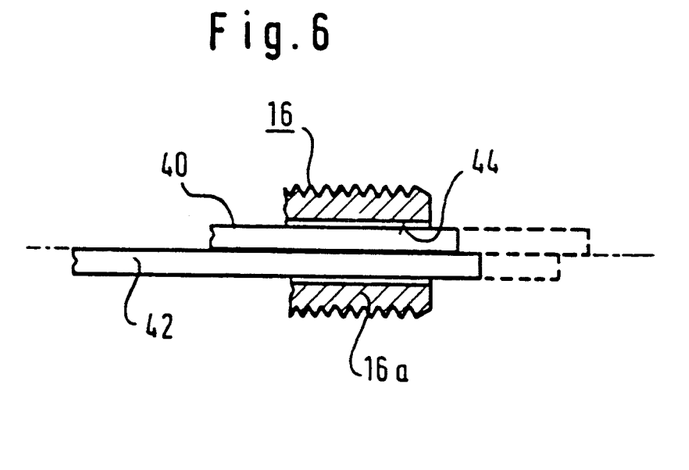
FIG. 6 shows an axial section of the region of one hub end of the multispeed cycle hub, with two compression rods in the hub bore.
Figure 7:
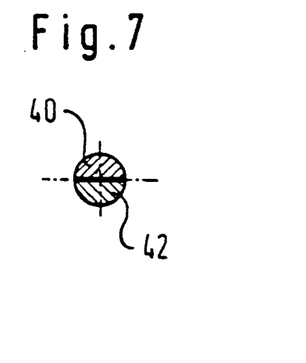
FIG. 7 shows a cross section of the two compression rods of FIG. 6.

Upon a linear displacement of the Bowden wire 28a in one direction or the other, owing to corresponding actuation of the speed-selection means 30, the rack element 58, moved stepwise (according to the spacing of the arrest apertures 76) accordingly in lengthwise direction 58b rotates the first and second cams K1 and K2 by way of the pinion 54d. The first pivot lever H1 in contact with the first cam is in contact by its upper end in FIGS. 1, 2 and 4 with the first cam K1, and this either directly or as indicated in FIG. 4, by way of a following roller 78. Consequently, the pivot lever Hi pivots according to the outline of the cam K1, in order subsequently to displace the compression rod 40 by its lower end in FIGS. 1, 2 and 4 by way of a rounded nose 79 there formed. The pivot lever H1, consequently in the form of a two-arm lever, thus rotates about the aforementioned bearing pin 56. Since the compression rod 40, as well as the other compression rod 42, is under a precompression stress at least when it is being thrust into the multispeed hub 12 from that speed position in which the shift rod protrudes farthest from the hub axle 16 (speeds 1 and 7 in FIG. 4, and speed 1 in FIG. 5), the pivot lever H1, as well as the pivot lever H2, in all speeds remains always in contact both with the circumferential curve (shift curve) of the cam K1 or K2, as the case may be, and with the outer end of the particular compression rod 40 or 42. In FIG. 9, corresponding compression springs 40a and 42a are indicated, acting Between the inner end of the compression rod 40, or of the compression rod 42, and the hub axle 16.

The two compression rods 40 and 42, each cam-controlled by itself, are required to shift the transmission 22, especially when the transmission comprises five or more speeds. The transmission 22 is in this case particularly configured as a multistep planetary gear. The shift from one planetary step to another then takes place by way of cam K1, pivot lever H1 and compression rod 40. The shift between power input into the internal gear of the planetary transmission (grade speeds 1 to 3) to the direct speed (4th speed) and thence to power input into the planetary gear carrier (high speeds, 5th to 7th) takes place by way of cam K2, pivot lever H2 and compression rod 42.

At the head 58d of the rack element 58, a projection is arranged in the form of an extension 80 threading into a prestressed auxiliary spring 82 arranged on the half-housing 50 and carrying it along when the last two speeds, (6th and 7th in FIGS. 4 and 5) are let in the direction of tension of the Bowden wire 28a. The extension 80 together with the auxiliary spring 82 thus form a restoring spring means operative only in 6th and 7th speeds.

The background of this arrangement is that force-transmission members like the Bowden cable 28 provided in the embodiment here described by way of example can generally he more heavily loaded in tension than in compression. When the cam K1, as seen in FIG. 4, is turned counterclockwise out of the 1st-speed position, the pivot lever H1 moves its nose 79 to the left until it has reached the position shown dotted with speed step 3. This extreme position is maintained until speed step 5. But then the pivot lever H1 swings back until at speed step 7 it has regained its original position according to the first speed. This shifting operation takes place during the tension phase of the Bowden wire 28a, where it is unproblematical that in transition to 6th and to 7th speed the restoring spring means consisting of extension 80 and spring 82, representing a spring reservoir, is increasingly strained.

The return shift from 7th into 6th and thence into 5th speed in the compression phase of the Bowden cable 28 presents no difficulties, even though the pivot lever H1 is now indeed swung clockwise in FIG. 4 and must overcome the counter force of the compression spring 40a of FIG. 9. On the Basis of the additional force stored in the auxiliary spring 82, in fact, the shift motion into 6th speed and 5th speed is correspondingly assisted. No later than upon shifting on into 4th speed, the extension 80 disengages from the auxiliary spring 19. Since during the continuing compression phase of the Bowden cable 28 with transition into speeds 3, 2 and 1 both pivot levers. Hi and H2 in each instance swing counterclockwise in FIGS. 4 and 5, in each instance assisted by the compression springs 40a and 42a, this shifting operation presents no difficulty. With especial ease, the cam K1 can be turned from speed position 3 to 2 and from position 2 to 1, since the shifting operation is assisted on the principle of the inclined plane by the cam K1 under the influence of the compression spring 40a. In the case of cam K2, the "inclined plane" lies between speed steps 5, 4 and 3. Since the pivot lever H2 maintains its extreme position between speed steps 5, 6 and 7, and so does not execute any contrary motion like pivot lever H1 in shifting through all speeds in one direction, the cam K1 does not per se require any spring reservoir. Apart from this, the spring reservoir described acts on both cams-K1 and K2, since it is actuated by the preceding rack element 58.

Figure 2:
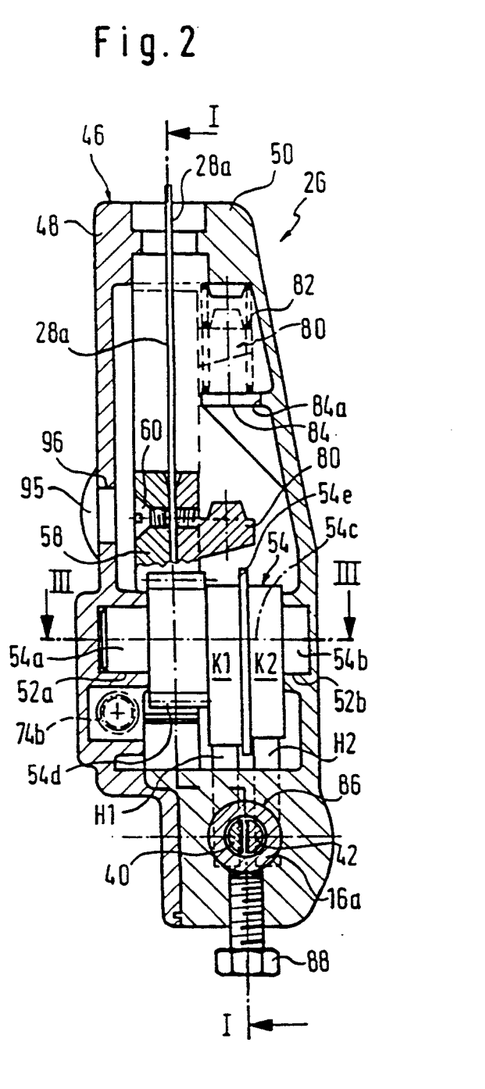
FIG. 2 shows a longitudinal section of the actuating means according to FIG. 1, representing the pivot element with gear and cams in section at the line II—II in FIG. 1.
Figure 3:
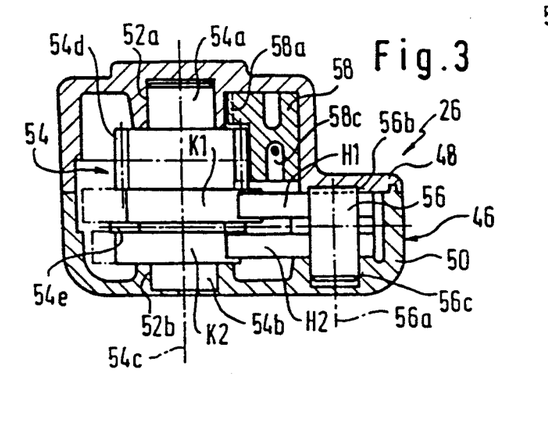
FIG. 3 shows a section at the line III—III at FIGS. 1 and 2.

As to the lodgment of the lower end in FIG. 2, towards the extension 80, of the auxiliary spring 82 (helical compression spring), be it noted that this end abuts a bracket-like holding element 84 having a central opening 84a to admit the extension 80. The upper end of the spring, on the other hand, abuts directly on the half-housing 50.

For mounting the actuating means 26 on the right-hand end in FIG. 9 of the hub axle 16, the half-housing 50 is provided with a hole 86 into which the right-hand end 16a of the hub axle 16 can be inserted, then to be fixed by means of a radially extending fastening screw 88 (see FIG. 2).

The installation attitudes (angular orientation in relation to the axis of rotation 17) of hub axle and actuating means 26 must be matched to each other, since the compression rods 40 and 42 must be arranged in defined position in relation to the noses 79 of pivot levers H1 and H2. As FIG. 8 for example shows, the two compression rods 40, 42 are essentially semicircular in cross section, with the two semicircle diameters in contact with each other. The pivot levers H1 and H2, therefore, must swing in a plane parallel to the plane of contact 92 of the two compression rods 40, 42, that is, the axis 56a must be perpendicular to the plane 92. So that pivot levers H1, H2 with simple noses 79 may be employed, not capable of securing the requisite compression rod orientation relative to the actuating means 26, this function is assumed by the multispeed hub 12 itself. This may be accomplished in that the longer of the two compression rods 40 and 42 is held stable inside of the cycle hub 12 in such a way that its rotational orientation with respect to the axis of rotation 17 does not vary. The other, shorter compression rod 42 will then align itself automatically by reason of mutual contact, guided within the bore 44.

Figure 8:
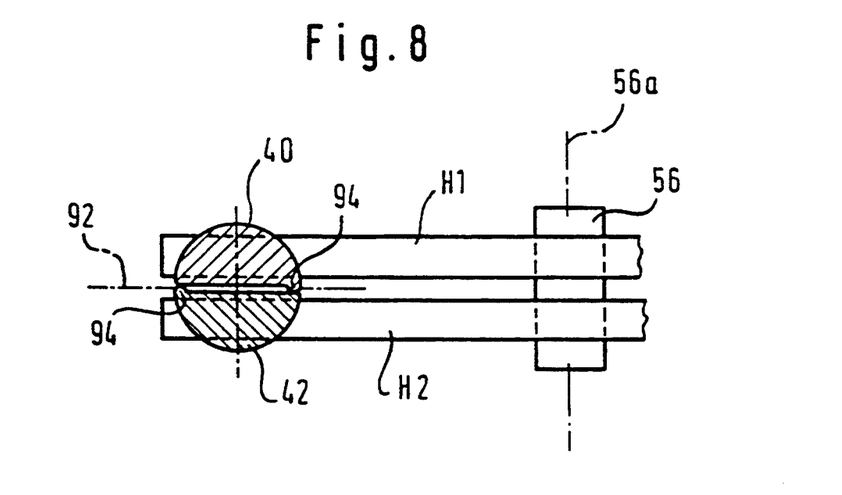
FIG. 8 shows an enlarged representation of the section of FIG. 7, indicating the first and second pivot levers.

In order to provide for dependable mutual contact with identical cross-sections while reducing friction, the two compression rods 40, 42 of FIG. 8 may each be provided with a projection 94 by which each compression rod makes contact with the other compression rod. This essentially semicircular projection in FIG. 8 is located in the case of the compression rod 42 in the region of the left-hand vertex between the diameter and the arc of the semicircle. The projection 94 of the upper compression rod 40 in FIG. 8 is located in the place diametrically opposite. In the result, a twofold line contact is obtained between the two compression rods 40 and 42, preventing a mutual area contact that would lead to higher frictional resistances.

The two half-housings 48 and 50 are connected together with a dust-tight seal, once the inner functioning parts as hereinbefore described have been put in place. A "lifetime" lubrication of the moving parts will ensure uniform proper functioning for a long time. The half-housings 48 and 50 may preferably be ultrasonically welded together. Alternatively, they may he screwed or riveted together, so that the housing can he dismantled again, although generally this will not he required.

Only, for adjustment of the effective length of the. Bowden cable, i.e. the place of attachment of the rack element 58 to the Bowden wire 28a, will access to the interior of the actuating means 26 be required. According to FIG. 2, for this purpose a closure cap 95 is provided, optionally closing off an access opening 96. The access opening 96 is located in the region of the fastening screw 60, when the rack element 58 is in 7th speed position. With the aid of a screwdriver inserted through the opening 96, the fastening screw 60 can be momentarily relieved and the Bowden wire 28a pushed into the desired position, whereupon the fastening screw 60 is tightened again and the closure cap 95 is replaced after withdrawing the screwdriver.

The actuating means, 26 above described permits control of the shifting operations inside of the cycle hub 12 by means of two pushrods 40, 42 with the aid of a single actuating member (Bowden wire 28a). The arrest means 64 permits accurate positioning of the speeds. The actuating means 26 is compact; in particular, its axial length (parallel to the axis of rotation 17) is comparatively short, so that the lateral projection of the installed actuating means 26 beyond the cycle outline is comparatively small. Owing to the bipartite closed housing, a closed system is obtained, ensuring uniform good service with use of suitable lubricants. Further, with the aid of the spring reservoir (extension 80, auxiliary spring 82), routine motions can be transferred from the compression phase to the tension phase of the force-transmission member (Bowden cable 28) in "push-pull" operation.

It is claimed:

1. An actuating mechanism for a multispeed cycle hub having a hub axle with two hub ends defining an axis of rotation, a hub sleeve rotatably mounted on the hub axle, a transmission shiftable among several speeds received in the hub sleeve, at least one drive gear in driving connection with an input element of the transmission, at least one output element of the transmission in driving connection with the hub sleeve, a bore extending axially through the hub axle, two elongated compressionally rigid speed change elements received in the bore of the hub axle parallel to the axis of rotation and having inner ends coupled to the transmission for shifting between speeds and outer ends extending into a region proximate to one of the two hub ends, the actuating mechanism comprising:

a housing adapted to be attached to the one hub end, a first cam, a second cam, and a pinion having engaging teeth, the first cam, second cam and pinion being connected to each other for conjoint rotation and forming a rotatable unit mounted in the housing for rotation about an axis, an elongated rack element having a longitudinal axis and mounted in the housing for movement parallel to the longitudinal axis, the rack element being adapted to be coupled to a speed-selection device by a force-transmission member and including a row of teeth in driving engagement with the engaging teeth of the pinion, a first pivot lever pivotably mounted in the housing in constant contact with the first cam so as to follow a pivoting motion defined by the shape of the first cam and engaging one of the two speed change elements so as to move the first speed change element upon pivotal movement in response to rotation of the first cam, and a second pivot lever pivotally mounted in the housing in constant contact with the second cam so as to follow a pivoting motion defined by the shape of the second cam and engaging the other of the two speed change elements so as to move the second speed change element upon pivotal movement in response to rotational movement of the second cam.

2. An actuating mechanism according to claim 1, and further comprising arrest means received in the housing for releasably establishing a plurality of arrest settings of the rotatable unit, each arrest setting corresponding to a speed of the shiftable transmission.

3. An actuating mechanism according to claim 2, wherein the arrest means comprises an arrest projection element mounted in the housing for movement between an engagement position and a disengagement position and biased into the engagement position by a spring element and an undulating arrest surface on the rack element, said arrest surface having a plurality of arrest notches aligned in succession in the direction of the longitudinal axis, each notch being associated with a speed of the transmission.

4. An actuating mechanism according to claim 1, wherein the housing has two housing parts connected to each other and forming an essentially closed housing.

5. An actuating mechanism according to claim 4, wherein at least one of the housing parts is provided with support means for supporting at least one of the rotatable unit, the first pivot lever, the second pivot lever, and the rack element.

6. An actuating mechanism according to claim 4, wherein each of the two housing parts constitutes a half-housing.

7. An actuating mechanism according to claim 1, wherein the first cam, the second cam and the pinion are carried by a common shaft.

8. An actuating mechanism according to claim 1, wherein the rack element is adapted to be connected to the force-transmission member by a fastening screw threaded into the rack element and the rack element is provided with an aperture extending parallel to the longitudinal axis and extending substantially throughout the length of the rack element, the aperture being adapted to receive a free end segment of the force-transmission member adjacent to the fastening screw.

9. An actuating mechanism according to claim 8, wherein the housing has a tool access opening in the region of the rack element and a removable closure element is installed in the access opening, whereby adjustment of the fastening position of the rack element on the force-transmission member is afforded by removing the closure element and inserting a tool through the access opening to release and retighten the fastening screw.

10. An actuating mechanism according to claim 1, and further comprising restoring spring means in the housing for biasing the rotatable unit so as to assist in establishing at least one but less than all of the speeds of the transmission.

11. An actuating mechanism according to claim 10, wherein the restoring spring means includes a spring received in the housing, the spring having one end engaging the housing and the other end engaging the rack element when the rack element is in positions establishing said at least one but less than all of the speeds of the transmission.

12. An actuating mechanism according to claim 11, wherein said other end of the spring engages a holding element having an aperture, and the rack element has a projection movable through the aperture to engage the other end of the spring.

13. An actuating mechanism according to claim 12, wherein when the force-transmission member is pulled out of the housing to execute a speed change of the transmission, the spring of the restoring spring means is increasingly compressed.

14. An actuating mechanism according to claim 3 wherein the rack element is received in a slideway in the housing on a side of the rack element remote from the arrest projection element of the arrest means.

15. An actuating mechanism according to claim 1, wherein the rack element has a head, the head receives a fastening screw for the force transmission member, and the head is guided in a guide formed in the housing.

16. An actuating mechanism according to claim 1, wherein the first pivot lever and the second pivot lever are received for pivotable movement on a common pivot bearing pin in the housing.

17. An actuating mechanism according to claim 16, wherein the first pivot lever and the second pivot lever are of two-arm configuration, each having a cam following end and an actuating end acting upon the respective speed-change elements.

18. An actuating mechanism according to claim 1, wherein the two speed-change elements are compression rods that extend parallel to the axis of rotation through the bore of the hub axle and are disposed side by side laterally of the axis of rotation.

19. An actuating mechanism according to claim 18, wherein the compression rods are of approximately semicircular cross section and are disposed with the diameters of the semicircles facing each other.

20. An actuating mechanism according to claim 19, wherein the two compression rods are in contact with each other by way of projections running parallel to the axis of rotation.

21. An actuating mechanism according to claim 20, wherein one of the two compression rods has a projection in the region of the vertex formed between the diameter and the circumference of the cross-sectional semicircle, and the other compression rod has a projection in the region of the vertex between the diameter and the circumference of the cross-sectional semicircle diametrically opposed to the projection on said one compression rod.

22. An actuating mechanism according to claim 18, wherein one of the two compression rods is longer than the other compression rod and extends farther into the hub axle than the other compression rod, and in that the longer compression rod is secured against twisting inside of the hub axle.

23. A multispeed cycle shift apparatus comprising a multispeed cycle hub having said actuating mechanism according to claim 1 speed-selection means, and a force-transmission member connecting the actuating mechanism to the speed-selection means.

* * * * *

UNITED STATES PATENT AND TRADEMARK OFFICE
CERTIFICATE OF CORRECTION

PATENT NO. : 5,392,668
DATED : February 28, 1995
INVENTOR(S) : Günther Nürnberger It is certified that error appears in the above-indentified patent and that said Letters Patent is hereby corrected as shown below:

On the title page:

Item [21], "Appln. No.: 302,460" should read --Appln. No.: 08/082,760--.

Signed and Sealed this

Tenth Day of November 1998

*Attest:*

BRUCE LEHMAN

*Attesting Officer*  *Commissioner of Patents and Trademarks*